Oct. 11, 1949.                 J. V. DAVIS                    2,484,079
                    HYDRAULICALLY-OPERATED PLATING MACHINE
Filed Aug. 16, 1946                                    6 Sheets-Sheet 1

INVENTOR.
JOHN V. DAVIS.
BY
Samuel Weisman
ATTORNEY.

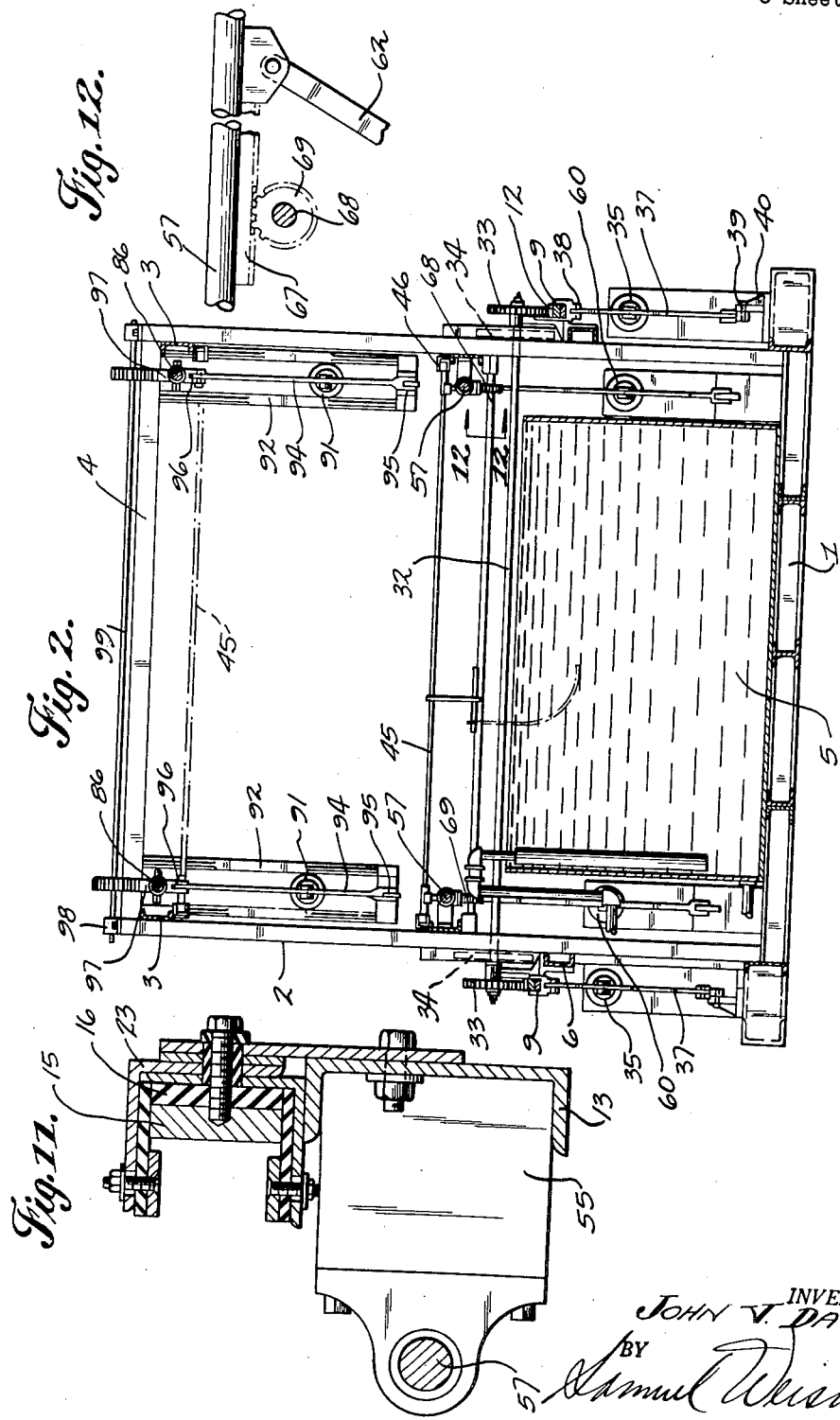

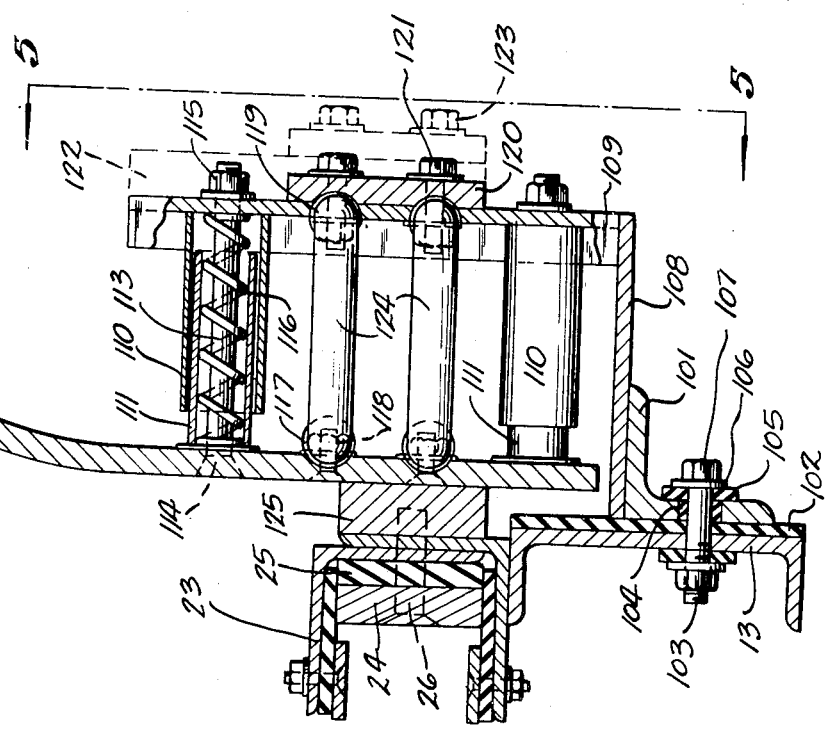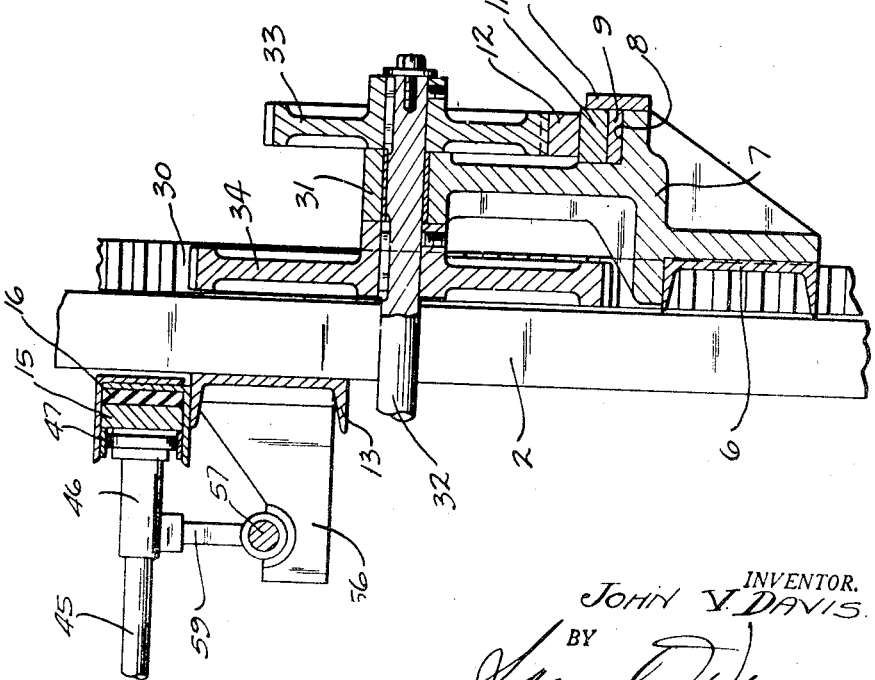

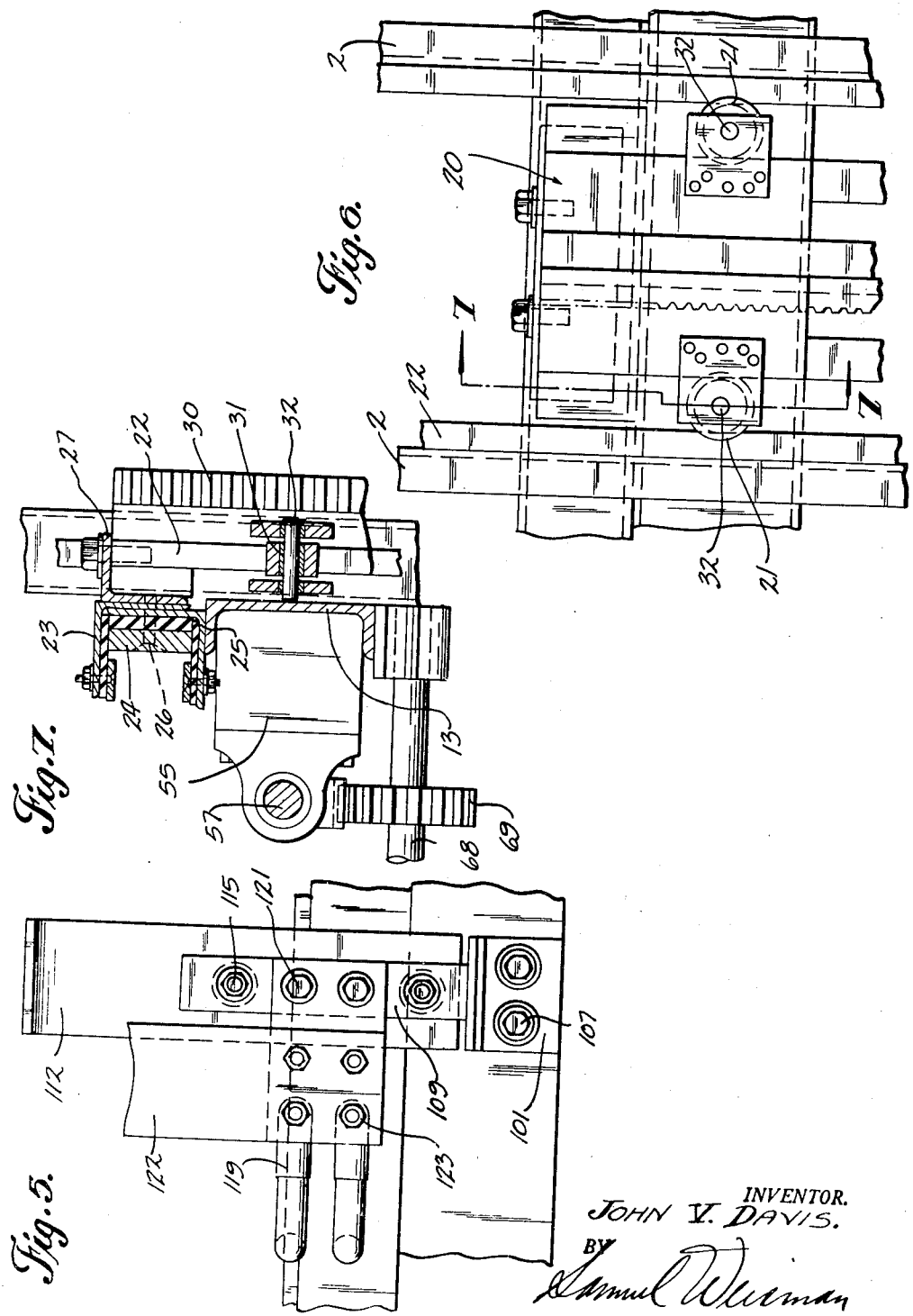

Oct. 11, 1949.　　　　　J. V. DAVIS　　　　2,484,079
HYDRAULICALLY-OPERATED PLATING MACHINE
Filed Aug. 16, 1946　　　　　　　　　　　6 Sheets-Sheet 5
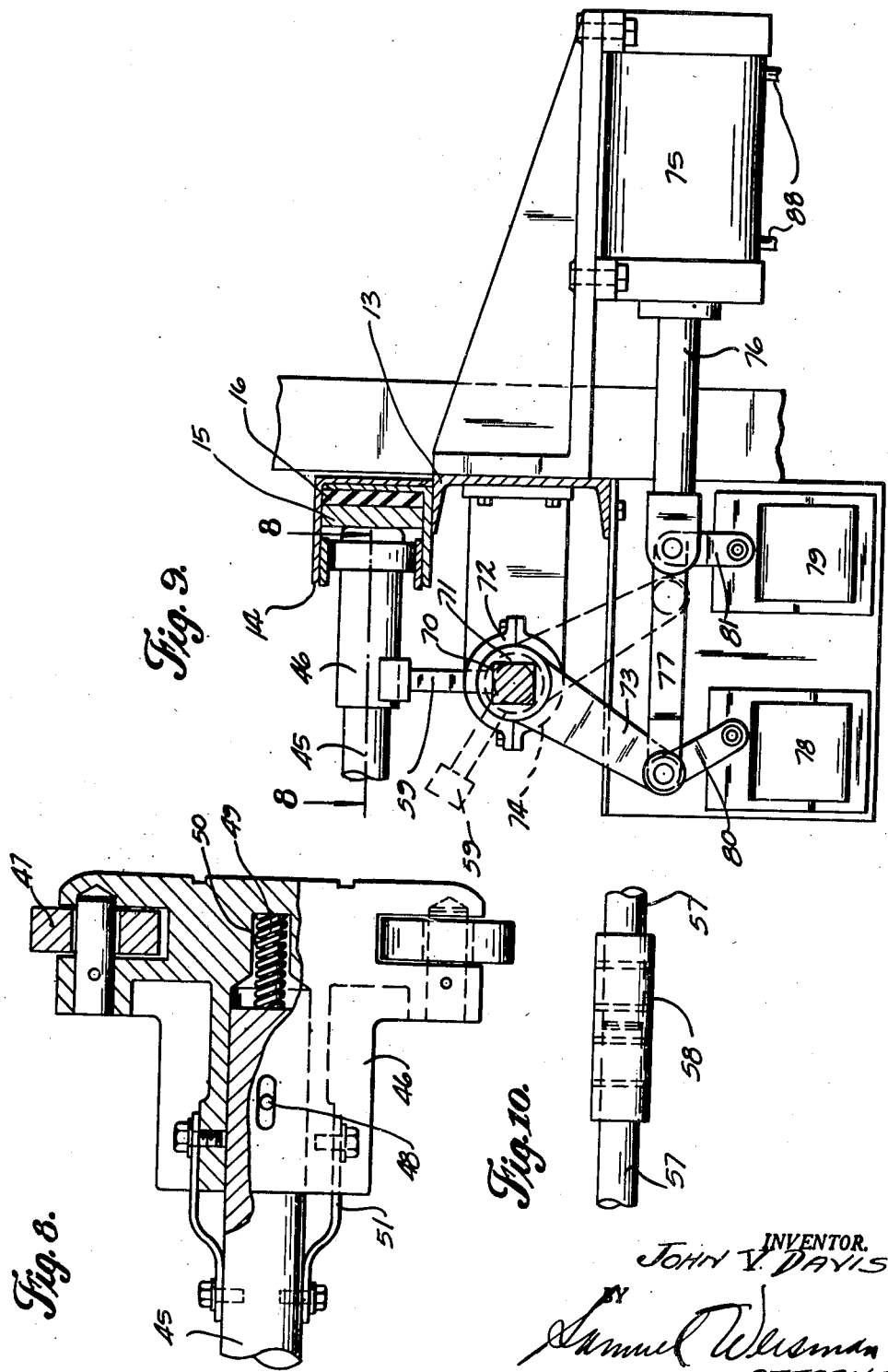
INVENTOR.
JOHN V. DAVIS
BY
Samuel Weisman
ATTORNEY.

Oct. 11, 1949.  J. V. DAVIS  2,484,079
HYDRAULICALLY-OPERATED PLATING MACHINE
Filed Aug. 16, 1946  6 Sheets-Sheet 6
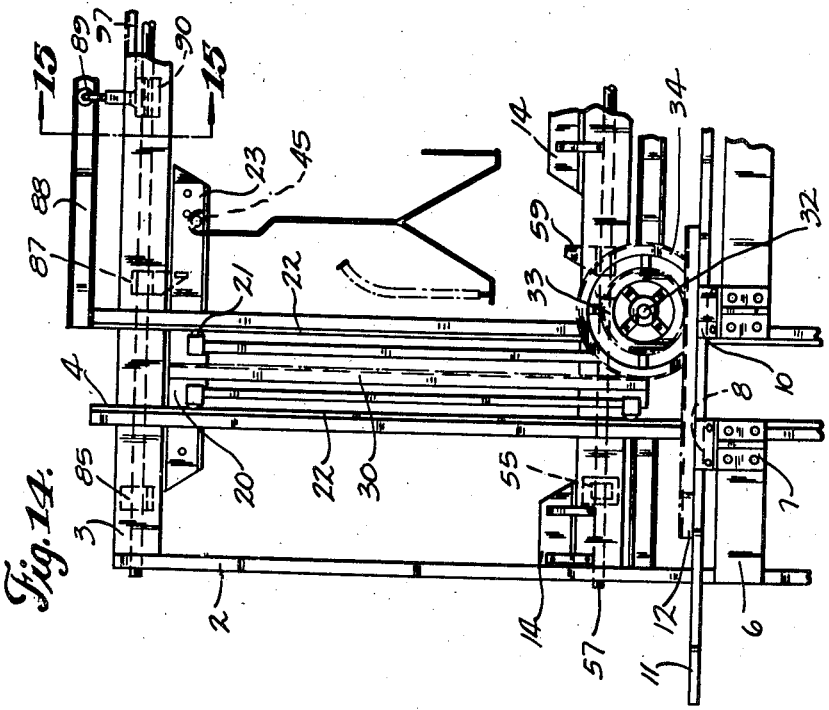
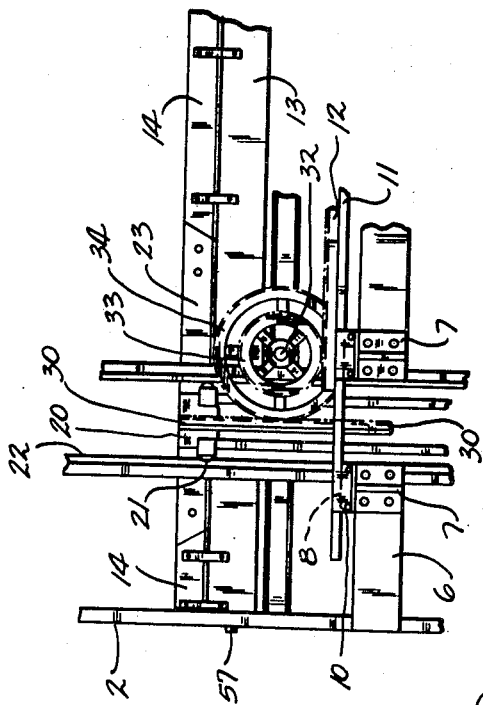
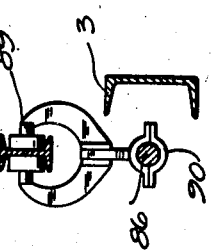
INVENTOR.
JOHN V. DAVIS.
BY
ATTORNEY.

Patented Oct. 11, 1949

2,484,079

UNITED STATES PATENT OFFICE 2,484,079

HYDRAULICALLY-OPERATED PLATING MACHINE

John V. Davis, Detroit, Mich., assignor to The Udylite Corporation, Detroit, Mich., a corporation of Delaware Application August 16, 1946, Serial No. 690,995

8 Claims. (Cl. 214—86)

The present invention pertains to a novel hydraulically operated plating machine. The principal object of the invention is to provide a machine of this character having work-advancing mechanism that requires no chains and which is fluid operated in all the various movements thereof.

The work-advancing mechanism, being chainless and non-continuous, has a linear reciprocating movement. Accordingly, this mechanism involves a reciprocating pusher shaft having a series of pushers extending therefrom and adapted to engage and advance the work carriers. In retracting the pushers preliminary to an advance, it is necessary that they clear the work carriers behind them. For this purpose the pusher shaft is rocked on its retracting movement to enable the pushers to pass beneath the carriers, after which the shaft and pushers are restored to their operating position for advancing the work carriers that have just been cleared. This rocking movement is accomplished by a rotatable and non-sliding sleeve mounted on a non-circular part of the pusher shaft and permitting this part to slide therethrough. The sleeve is rocked or oscillated by a suitably timed hydraulic mechanism. Also, the pusher shaft is reciprocated by suitably timed hydraulic mechanism.

Another object of the invention is to lift the work from each tank to the next in a series of tanks. For this purpose the work carriers ride on opposed rails comprising fixed sections and movable sections. The movable sections occur at the junctures of successive tanks and are elevated, with the work carriers thereon, when the work is to be transferred from one tank to the next. The elevating mechanism comprises a system of toothed racks and pinions actuated by properly timed hydraulic mechanism. In the elevated position the elevated carriers are advanced on the movable rail sections by pusher means similar to that already mentioned, and this means also is operated by suitably timed hydraulic mechanism. Thus, the complete apparatus has the characteristics of being chainless and hydraulically operated throughout.

Another object of the invention is to prevent the entrance of dirt particles and other foreign matter between the movable contact of each work carrier and the live cathode conducting strip or bar. To accomplish this object, the rails for the work carriers are in the form of channels facing inwardly, and the conducting strips are set vertically in the channels at some distance from their respective lateral openings. The work carriers are provided with shoes riding in the channel rails and contacting the conducting strips in vertical planes. The shoes are preferably spring-pressed against the conducting strips for firm contact.

Other objects of the invention and advantages thereof will appear as the description proceeds.

The invention is fully disclosed by way of example in the following description and in the accompanying drawings in which:

Figure 2 is a section on the line 2—2 of Figure 1;

Figure 3 is a section on the line 3—3 of Figure 1;

Figure 4 is a section on the line 4—4 of Figure 1;

Figure 5 is an elevation on the line 5—5 of Figure 4;

Figure 6 is a detail in the plane of Figure 1;

Figure 7 is a section on the line 7—7 of Figure 6;

Figure 8 is a section, partly in elevation, on the line 8—8 of Figure 9;

Figure 9 is a section on the line 9—9 of Figure 1;

Figure 10 is a detail in the plane of Figure 1;

Fig. 11 is a section on the line 11—11 of Figure 1;

Figure 12 is a detail elevation on the line 12—12 of Figure 2;

Figure 13 is a detail side elevation of the machine, showing a movable rail section in its lower position;

Figure 14 is a similar detail showing the movable rail section in its upper position, and Figure 15 is a section on the line 15—15 of Figure 14.

Reference to these views will now be made by use of like characters which are employed to designate corresponding parts throughout.

Figure 1:
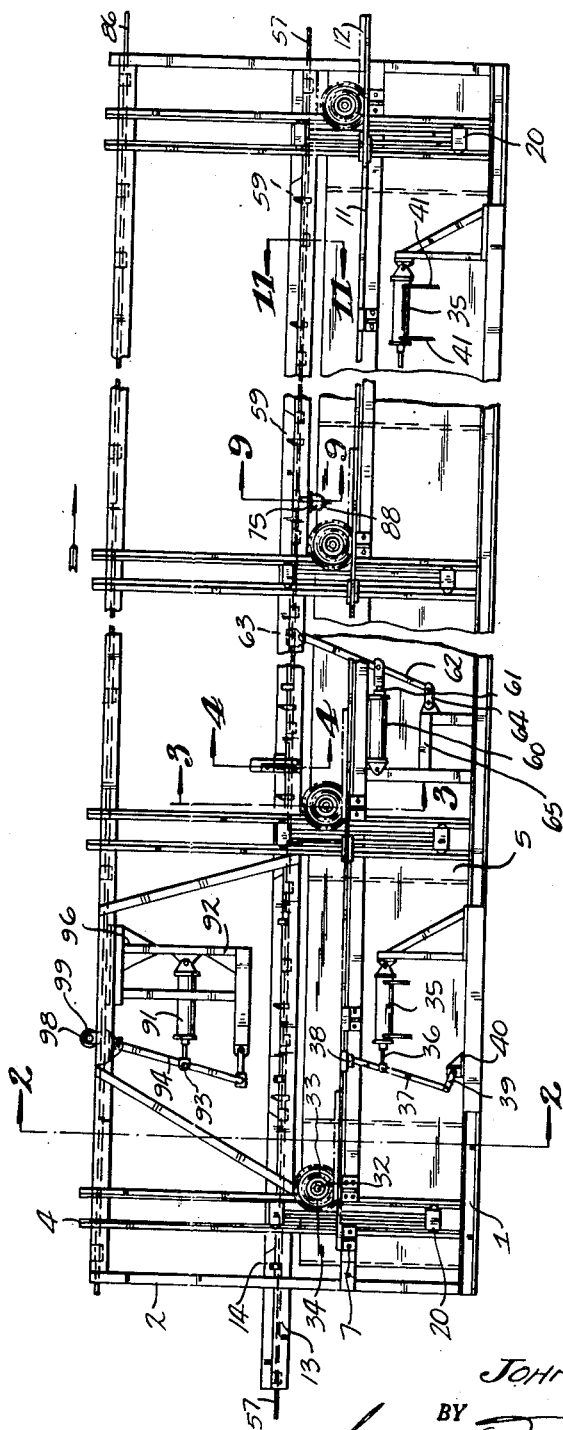
Figure 1 is a side elevation of the device.

In Figures 1 and 2 the machine is shown as built on a frame comprising a suitably constructed elongated base 1, pairs of uprights 2 erected at the longitudinal edges of the base, longitudinal rails 3 at the upper ends of the uprights, and cross bars or braces 4 joining the opposed upper rails 3. Additional uprights and braces may be provided wherever desired. Plating tanks 5 are supported on the base 1 in a longitudinal contiguous series, and the pairs of uprights 2 are positioned near the ends of the tanks for a purpose that will presently be described.

The uprights 2 at each side of the machine carry an outwardly disposed rail 6 which may, if desired, consist of a number of spaced and alined sections and which lie somewhat below the top of the tanks 5. At intervals the rails 6 carry bearing brackets 7 providing horizontal surfaces 8 on which bearing strips 9 of bronze or the like are laid. A vertical plate 10 fastened to the outer edge of each bracket completes a channel for holding the strip 9. A rack bar 11 extending substantially the entire length of the machine is laid on the strips 9, and to the bar 11 are fastened upwardly extending racks 12 at selective intervals.

Longitudinal supporting rails 13 are carried by the uprights 2 at the inner sides thereof and slightly above the top of the tanks 5. On the rails 13 are mounted fixed and spaced rail sections 14 of channel formation and facing inwardly. Each section 14 receives a current conducting rail or strip 15 insulated from the frame structure by a suitable insulating strip 16.

The interrupted work rail sections 14 are made continuous by the insertion of vertically movable sections in the intervening spaces. The work is suspended from and propelled along the continuous rails, and when the work is to be transferred from one tank to the next, it is lifted by the vertically movable sections to a position where it clears the tops of the tanks. The work is transferred while suspended from the elevated movable rail sections. The mechanism for accomplishing this operation will now be described.

Between the members of each pair of uprights 2 is mounted an elevator frame 20 provided near its corners with grooved rollers 21 riding on vertical tracks 22 carried by or formed with the uprights. The upper end of each elevator carries a rail section 23 that fits into a space between adjacent sections 14 when the elevator is lowered. In the lowered position the sections 23 rest on the support rail 13, as shown in Figure 7. The sections 23 are shaped similarly to the sections 14 and comprise inwardly facing channel structures with conducting strips 24 and insulators 25. The members 24 and 25 are fastened together by bolts 26 which are attached to angle brackets 27 by means of which the sections 23 are attached to the respective elevators.

Each elevator carries an outwardly disposed vertical rack bar 30 having its teeth facing in the lengthwise direction of the frame. Adjacent to each rack 30, the members 7 are formed with bearings 31 alined horizontally and transversely of the frame. In each pair of alined bearings 31 is journalled a shaft 32 carrying at each end a gear 33 meshing with the adjacent horizontal rack 12 and a larger gear 34 meshing with the adjacent vertical rack 30.

At each side of the frame are mounted horizontal hydraulic cylinders 35. The piston rods 36 are extended outwardly from the cylinders and are attached respectively to pusher arms 37 which in turn have their upper ends pivotally attached at 38 to the elognated rack carriers 11. The lower ends of the arms 37 are articulated by links 39 to suitable blocks 40 on the base of the frame.

The cylinders 35 are timed to operate automatically and in unison by control of the flow of fluid in their connections 41. The piston rods 36 cause the arms 37 to slide the carrier 11 in one direction or the other, thereby rotating the gears 33 and the cross shafts 32 as well as the gears 34 in a given direction. Consequently the elevators 20 with their movable rail sections 23 are raised or lowered, according to the direction of the piston rods 36, and at a faster rate than the linear speed of the horizontal racks 12 meshing with the gears 33.

Work supporting rods 45 extending transversely of the frame have their ends mounted in shoes 46 received and travelling in the opposed rails comprised of sections 14 and 23. Each shoe carries a pair of end rollers 47 riding on shims fitted to the inner upper and lower surfaces of the respective rail sections. The shoes are slidably mounted on the ends of the rods 45 by slot and pin connections designated by the numeral 48 in Figure 8. A compressed coil spring 49 is inserted in a cavity 50 of each shoe and bears against the adjacent end of the rod 45. In this manner the shoes are maintained in yielding and firm contact with the adjacent conductors 15 and 24. Current is carried from the shoes to the respective rods 45 by braided or other flexible conductors 51 fastened to both parts.

At intervals the support rails 13 carry inwardly extending bearings 55 (Figure 11) and cradles 56 (Figure 3) to support a linearly reciprocating pusher shaft 57. The shaft, which extends substantially the entire length of the machine, is made up of a number of sections coupled together by sleeves 58 as shown in Figure 10. Rigid pusher fingers 59 extend upwardly from the shaft 57 a sufficient distance to strike the work rods 45 when advanced thereto and are properly spaced for this purpose with relation to the rods.

The pusher shafts 57 are oscillated from hydraulic cylinders 60 at opposite sides of the frame. The piston rods 61 extending out from the cylinders are connected respectively to arms 62 which have their upper ends pivotally fastened to brackets 63 attached to the shafts 57. The lower ends of the arms 62 are joined by articulated links 64 to suitable bases 65 on the floor. The ends of each cylinder 60 have fluid connections 66, and the flow of fluid is automatically regulated to oscillate the shafts 57 linearly.

To each shaft 57 is secured a downwardly facing rack 67. Transverse shafts 68 are suitably journalled across the frame and carry gears 69 meshing respectively with the racks 67. This mechanism equalizes the movement of the opposed shafts 57 regardless of any irregularity in the operation of the opposed cylinders 60.

After having advanced the work rods 45, the pushers 59 must be retracted with their shaft 57 in readiness for another advance. In this retracting movement the fingers 59 must be displaced in order not to strike against the rods 45 behind them.

The mechanism for accomplishing such displacement of the pushers 59 is a means for rocking the shaft 57 and is illustrated in Figure 9.

At suitable intervals the shaft 57 is squared or otherwise non-circularly shaped at 70. These portions are received in sleeves 71 having a similarly shaped interior in which the sections 70 are adapted to slide, whereby not to impede the linear reciprocating of the pusher shaft 57, and the sections 70 are of sufficient length to accommodate these movements. The outer surface of each sleeve 71 is cylindrical and is rotatably received in a bearing 72 suitably supported by the adjacent member 13. An arm 73 extends from the sleeve 71 through a slot 74 in the bearing 72. The arm 73 is swung to produce the aforementioned rocking of the shaft 57.

Adjacent to each arm 73 a hydraulic cylinder 75 is supported by the frame structure on an axis transverse of the frame. The piston rod 76 is joined by a pivoted link 77 to the free end of the arm 73. The link is connected to limit switches 78 and 79 by short links 80 and 81 respectively. The fluid for operating the cylinder 75 is passed through connections 88 at the ends. When the pusher shaft 57 has reached the end of its stroke in either direction, it operates a mechanism (not shown) for actuating the piston rods 76 in the proper direction. The limit switches 78, 79 are set to determine the desired end positions of the arms 73 by cutting off the pressure to the cylinders 75 at the proper time.

To summarize this operation, let it be assumed that the pushers 59 have advanced the work rods 45 the length of one stroke. The shafts 57 and pushers 59 are next retracted in preparation for another advance. In order that the pushers will not strike the next rearward rods 45, the cylinders 75 are automatically actuated to rock the shafts 57 so that the pushers clear the rods 45. The retraction of the shafts 57 is continued somewhat until the pushers are behind the rods 45 that they have cleared. At this time an automatic mechanism comes into operation to rock the shafts 45 again and bring the pushers 59 to an upright and operative position with respect to the rods 45. The shafts 57 are now advanced again to advance the work in the tanks. The movement of the work occurs only when the vertically movable rail sections 23 are lowered and in alinement with the fixed sections 14.

When the work is about to be transferred from one tank to the next, the rods 45 rest on movable rail sections 23 which cross from one tank to the next. The cylinders 35 are now automatically energized to shift the racks 12 and rotate the gears 34 in a direction that raises the vertical racks 30 and the rail sections 23 carried by the elevators 20. This movement is timed and automatic by regulating devices that are well known in the art and therefore need not be described in detail. The sections 23 are maintained in the elevated position a sufficient length of time to permit the transfer.

The upper frame rails 3 carry a number of inwardly extending bearings 85 which support an upper pusher shaft 86 along each side of the frame. The shafts 86 carry downwardly extending pushers 87 positioned to engage the work bars 45 when elevated with the movable rail sections 23.

The shafts 86 are oscillated linearly by a mechanism similar to that employed for the lower pusher shafts 57.

Hanger channel sections 88 are supported over the rails 3 and above the ends of the tanks 5. Rolling hangers 89 are suspended from the sections 88 and carry clamps 90 fastened to the pusher shafts 86.

Horizontal cylinders 91 are mounted in suitable frames 92 at the sides of the machine. The piston rods 93 are pivotally attached to rocker arms 94 having their lower ends pivotally connected at 95 to the respective frames 92. The upper ends of the arms 94 are pivotally connected to brackets 96 fixed to the clamps 90. It is evident that the upper pusher shafts 86 are oscillated linearly by operation of the cylinders 91. The hangers 89 provide the shafts 86 with additional support at the points where they are pushed and pulled by the arms 94.

At intervals the shafts 86 carry upwardly facing rack bars 97. Adjacent to the bars 97, the rails 3 carry transversely alined bearings 98, and an idle shaft 99 is mounted in each pair of alined bearings. Each shaft 99 carries a pair of gears meshing with opposed racks 97 to equalize the movements of the opposed pusher shafts 86 notwithstanding irregularity in the operation of the cylinders 91.

When the work rods 45 have been elevated with the movable rail sections 23, the cylinders 91 are automatically set in operation to advance the elevated rods 45 and thereby transfer the work from a position directly over one tank to a position directly over the next tank. When the transfer has been completed, the cylinders 35 come into operation to return the rail sections 23 into alinement with the fixed sections 14, after which another advance of the work takes place in the manner already described. The cylinders 61 are automatically reversed to return the shafts 86 and their pushers 87 to an initial position. When the work is ready to pass to another tank, another cycle is initiated to elevate the sections 23 and operate the upper pusher shafts 86 in the manner already described.

The invention is applicable, as illustrated, to a series of more than two tanks. In such case the length of the tanks and the relative lengths of the fixed and movable rail sections are so determined and the hydraulic systems are so timed that all the work is elevated simultaneously at the junctions of contiguous tanks and simultaneously transferred. Nevertheless, it is within the scope of the invention to design the mechanism for non-simultaneous transfer at various locations. In order to bring cathode current to the alined rail sections 14 and 23, there is provided a series of clapper switches as shown in Figures 4 and 5. Each such switch is mounted at a space between adjacent sections 14 and is supported by a bracket 101 fastened to the outer surface of the supporting rail 13. An insulating strip 102 is interposed, and the parts are held together by bolts 103. Each bolt is surrounded by an insulating bushing 104 engaging the strip 102 at one end and by an insulating collar 105 lying between the other end of the bushing and a collar 106 beneath the head 107 of the bolt.

A bottom plate 108 is fastened upon the bracket 101 and has a vertical channel 109 fastened to its outer edge.

A pair of tubes 110 are fastened to the bottom of the channel 109 and receive slidable tubes 111. An upwardly extending guide and pressure plate 112 is fastened to the exposed ends of the tubes 111 and lies over the bracket 101. In each tube 111 is mounted a rod 113 with one end anchored at 114 to the plate 112 and the other end passed slidably through the bottom of the channel and fitted with a nut 115 outside of the channel. A coil spring 116 surrounds the rod 113 and bears against the bottom of the channel and the outer surface of the plate 112 to force the plate towards the frame member 13.

A pair of longitudinally extending cable lugs or sockets 117 is seated against the outer surface of the plate 112 and held by bolts 118. A similar pair of lugs 119 is seated in the bottom of the channel 109 and engaged by a terminal plate 120 fastened on the outer surface of the channel by bolts 121. A cathode bar 122 of suitable dimensions is secured to the plate 120 by bolts 123, two of which are employed to secure the lugs 119. The lugs 117 are connected respectively to the lugs 119 by cables 124 which carry the cathode current from the terminal 120 to the spring-pressed plate 112.

The outer surface of the movable rail section 23 carries a conducting bar 125 adapted to make snug surface engagement with the switch plate 112. The latter is positioned so that the springs 116 will be compressed somewhat when it is engaged by the bar 125. In other words, the plate 112 lies in the path of the bar 125 on the descent of the latter and is deflected somewhat as the descending bar engages the curved upper end of the plate 125, whereby to compress the springs 116 and make the firm surface contact shown in Figure 4.

Although a specific embodiment of the invention has been illustrated and described, it will be understood that various alterations in the details of construction may be made without departing from the scope of the invention as indicated by the appended claims.

What I claim is:

1. In a plating machine, a frame, a pair of rails supported thereby, a series of spaced work carriers movably mounted on said rails, pusher shafts rotatably and slidably mounted adjacent to said rails and spaced respectively therefrom, a series of pushers extending from said shafts and adapted to engage said carriers, means for reciprocating said shafts, racks carried by said shafts, a shaft rotatably supported across said frame, gears on the last named shaft and meshing respectively with said racks to equalize the sliding motion of the first named shafts, means for rocking said pusher shafts and pushers on linear movement thereof in the retracting direction to clear said carriers whereby said pushers pass said carriers without contact therewith, the last named means being adapted to rock said pusher shafts to a restored position to bring said pushers into engagement with said carriers on movement of said pusher shafts in the advancing direction.

2. In a plating machine, a frame, a rail supported thereby, a series of spaced work carriers movably mounted on said rail, a pusher shaft slidably mounted adjacent to said rail and spaced therefrom, a series of pushers extending from said shaft and adapted to engage said carriers, means for reciprocating said shaft, a fixed bearing around said shaft, a sleeve rotatable in said bearing, said shaft passing slidably and non-rotatably through said sleeve, means for rocking said sleeve on the linear movement of said shaft in the retracting direction, whereby to rock said shaft and clear said pushers from said carriers, the last named means being adapted to rock said shaft to a restored position to bring said pushers into engagement with said carriers on movement of said shaft in the advancing direction.

3. In a plating machine, a frame, a pair of rails supported thereby, a series of spaced work carriers movably mounted on said rails, pusher shafts rotatably and slidably mounted adjacent to said rails and spaced respectively therefrom, a series of pushers extending from said shafts and adapted to engage said carriers, means for reciprocating said shafts, racks carried by said shafts, a shaft rotatably supported across said frame, gears on the last named shaft and meshing respectively with said racks to equalize the sliding motion of the first named shafts, means for rocking said pusher shafts and pushers on linear movement thereof in the retracting direction to clear said carriers whereby said pushers pass said carriers without contact therewith, the last named means being adapted to rock said pusher shafts to a restored position to bring said pushers into engagement with said carriers on movement of said pusher shafts in the advancing direction, and self-stopping means operative on said rocking means in both directions.

4. In a plating machine, a frame, a rail supported thereby and including fixed sections and intervening movable sections, means for elevating said movable sections, a series of spaced work carriers movably mounted on said rail, a pusher shaft slidably mounted adjacent to said rail and spaced therefrom, a series of pushers extending from said shaft and adapted to engage said carriers, means for reciprocating said shafts, means for rocking said shaft and pushers on linear movement thereof in the retracting direction to clear said carriers, whereby said pushers pass said carriers without contact therewith, said means being adapted to rock said shaft to a restored position to bring said pushers into engagement with said carriers on movement of said shaft in the advancing direction, and reciprocating pusher means supported by said frame at the elevated position of said movable sections.

5. In a plating machine, a frame, a rail supported thereby and including fixed and movable sections, means for elevating said movable sections, a series of spaced work carriers movably mounted on said rail, a pusher shaft slidably mounted adjacent to said rail and spaced therefrom, a series of pushers extending from said shaft and adapted to engage said carriers, means for reciprocating said shaft, means for rocking said shaft and pushers on linear movement thereof in the retracting direction to clear said carriers, whereby said pushers pass said carriers without contact therewith, said means being adapted to rock said shaft to a restored position to bring said pushers into engagement with said carriers on movement of said shaft in the advancing direction, reciprocating pusher means supported by said frame at the elevated position of said movable sections, fluid-operated means for reciprocating said pusher shaft and said pusher means, and fluid-operated means for rocking said pusher shaft.

6. In a plating machine, a frame, a rail supported thereby and including fixed and movable sections, means for elevating said movable sections, a series of spaced work carriers movably mounted on said rail, a pusher shaft slidably mounted adjacent to said rail and spaced therefrom, a series of pushers extending from said shaft and adapted to engage said carriers, means for reciprocating said shafts, means for rocking said shaft and pushers on linear movement thereof in the retracting direction to clear said carriers, whereby said pushers pass said carriers without contact therewith, said means being adapted to rock said shaft to a restored position to bring said pushers into engagement with said carriers on movement of said shaft in the advancing direction, a reciprocating pusher shaft supported by said frame at an elevated position, pushers carried by the last named shaft and adapted to engage work carriers on the elevated movable sections, fluid-operated means for reciprocating both pusher shafts, and fluid-operated means for rocking the first named pusher shaft.

7. In a plating machine, a frame, a horizontal rail supported thereby and including fixed sections and an intervening movable section, a vertical toothed rack secured to said movable section and vertically guided by said frame, a horizontal toothed rack supported by said frame for longitudinal movement, a shaft journalled transversely of said frame, gears on said shaft and meshing respectively with said racks, means for reciprocating said horizontal racks, work carriers on said rail, and means for moving said carriers on said rail.

8. In a plating machine, a frame, a pair of horizontal rails supported thereby, each rail including fixed sections and an intervening movable section, a vertically toothed rack secured to each movable section and vertically guided by said frame, a horizontally toothed rack supported at each side of said frame for longitudinal movement, a shaft journalled transversely of said frame, a pair of gears on each end of said shaft and meshing respectively with said racks, means for reciprocating said horizontal racks, whereby the horizontal motions of the last named racks are balanced by said shaft and gears, work carriers on said rails, and means for moving said carriers on said rails.

JOHN V. DAVIS.

REFERENCES CITED

The following references are of record in the file of this patent:

UNITED STATES PATENTS

| Number | Name | Date |
|---|---|---|
| 1,125,110 | Jones | Jan. 19, 1915 |
| 1,128,481 | Miller | Feb. 16, 1915 |
| 1,866,124 | Oertli | July 5, 1932 |
| 1,871,339 | Pearson | Aug. 9, 1932 |
| 1,906,036 | Wunderlich | Apr. 25, 1933 |
| 2,299,618 | Finston | Oct. 20, 1942 |
| 2,360,836 | Leopold | Oct. 24, 1944 |
| 2,428,856 | Sinclair | Oct. 14, 1947 |

FOREIGN PATENTS

| Number | Country | Date |
|---|---|---|
| 2,704 | Great Britain | June 26, 1913 |
| 375,727 | Germany | May 18, 1923 |
| 478,284 | Germany | June 25, 1929 |
| 126,695 | Switzerland | Apr. 30, 1927 |